United States Patent Office 3,420,901
Patented Jan. 7, 1969

3,420,901
PROCESS FOR THE OXYCHLORINATION OF ORGANIC COMPOUNDS
Arthur C. Schulz, North Tonawanda, N.Y., assignor to Hooker Chemical Corporation, Niagara Falls, N.Y., a corporation of New York
No Drawing. Continuation-in-part of application Ser. No. 371,775, June 1, 1964. This application Oct. 23, 1967, Ser. No. 677,091
U.S. Cl. 260—659                7 Claims
Int. Cl. C07c 17/00; B01j 11/78

ABSTRACT OF THE DISCLOSURE

There is provided a process for the oxychlorination of organic compounds wherein a compound selected from the group consisting of lower alkanes, lower alkenes, and the partially chlorinated derivatives thereof is contacted in the vapor phase with a chlorinating agent and an oxygen-containing gas in the presence of an oxychlorination catalyst which is comprised of from 1 to about 35 percent of a variable valence metal of groups 3–8 of the periodic table and from about 65 to 99 percent alumina.

---

This is a continuation-in-part of S.N. 371,775, filed June 1, 1964, now abandoned.

This invention relates to a novel process for the chlorination of organic compounds and more specifically relates to the oxychlorination of organic compounds in the presence of a complex catalyst.

Olefins such as ethylene, propylene, butylene and the like can be oxychlorinated at temperatures of from about 200 degrees centigrade to about 600 degrees centigrade in the presence of a catalyst comprised of the chlorides of metals possessing variable valences. Such processes, however, frequently result in either low yield of product and/or low purity of the product. This is because high conversions of starting materials to products call for high reaction temperatures which result in considerable combustion of the starting reactants, thereby contributing to loss in yield and contamination of the product. Catalysts normally used for oxychlorinations are often not either chemically or mechanically stable in the reaction system, thereby resulting in either a continued decrease in conversion of the starting reactants or the necessity of replacement of the catalyst after relatively short operating periods.

In accordance with the present invention there is provided a novel oxychlorination process for the preparation of chlorinated compounds which comprises contacting in the vapor phase an organic compound with a chlorinating agent and an oxygen-containing gas in the presence of a complex metal alumina catalyst.

In a specific embodiment of the present invention, there is provided a novel oxychlorination process which comprises reacting in the vapor phase an organic compound selected from the group consisting of alkanes of from 2 to about 3 carbon atoms, and alkenes of from 2 to about 4 carbon atoms, as well as their partially halogenated derivatives, with a chlorinating agent and an oxygen-containing gas in the presence of a complex metal alumina oxychlorination catalyst which is comprised of from 1 to about 35 percent of a variable valence metal of Group III through Group VIII of the periodic table coprecipitated with about 65 to 99 percent alumina. It is, of course, appreciated that reactants containing non-reactive (non-interfering) substituents and possessing sufficient volatility which will act in the manner described herein can also be utilized in the practice of the process of the present invention.

Illustrative examples of the alkane reactants which may be utilized in accomplishing the process of the present invention include ethane and propane, while examples of alkenes include ethylene, propylene, 1-butylene, 2-butylene and isobutylene.

The chlorinating agent utilized can be any agent which will not adversely affect the reaction mechanism, as described herein, such as hydrochloric acid, chlorine, mixtures of chlorine with hydrochloric acid, and the like, while the oxygen-containing gas can be air, substantially pure oxygen and mixtures of either or both together with inert gases such as nitrogen, carbon dioxide, and carbon monoxide, if desired.

The preferred catalyst is a porous solid of high mechanical, chemical and thermal stability under the reaction conditions. The catalyst is used in the form of particles, granules, chips, pellets, and the like, with the granular form being preferred, particularly in the fluidizing size previously described. Inert solid diluents, such as carbon or graphite, can also be mixed therewith if desired.

The copper-alumina complex is prepared in the manner described in U.S. Patent 1,963,761 by causing alumina hydrate ($Al_2O_3 \cdot 3H_2O$) and cupric chloride to coprecipitate in sufficient proportions to result in a catalyst composition containing the desired proportions of copper and alumina. The precipitated complex is filtered from the mother liquor, washed, dried and subsequently roasted at a temperature of about 200 degrees centigrade to 400 degrees centigrade. The resulting product is a hard porous material, normally greenish in color, having a specific gravity greater than one. It is physically and chemically durable and has an indefinitely long operating life. Typically the applicant's process can be conducted with said preferred catalyst for from about 12 to about 48 months before replacement of the catalyst is required.

Said preferred catalyst is generally prepared by contacting a solution of alumina hydrate ($Al_2O_3 \cdot 3H_2O$) with a variable valence metal halide and hydrochloric acid, thereby causing the coprecipitation of the alumina hydrate and the variable valence metal halide. The alumina hydrate, which is dissolved in a suitable solvent therefor such as sodium hydroxide, may be contacted with a solution of the variable valence metal halide in hydrochloric acid in order to prepare the catalyst. Alternatively, both the aluminum hydrate and the variable valence metal may be dissolved in a suitable solvent, and hydrochloric acid may be added to this solution to cause coprecipitation.

Some suitable solvents which may be used to dissolve the alumina hydrate include, for example, alkali metal hydroxides such as sodium hydroxide, potassium hydroxide, lithium hydroxide, calcium hydroxide, and the like.

In place of copper in the preferred catalyst, or in addition thereto, one or more metals of Group III through Group VIII of the periodic table as shown in "Lange's Handbook of Chemistry," 8th edition, pages 56 and 57, which possess variable valences, such as scandium, titanium, vanadium, nickel, chromium, cobalt, iron, uranium, silver and gold, can be used as an ingredient in the catalyst. The preferred catalyst, however, is comprised of a major portion of alumina ($Al_2O_3$) and a minor but effective proportion of copper, the remainder of the catalyst, if any, being substantially inert materials which may be mere impurities. Generally, this complex copper-alumina catalyst contains from about 65 percent to 99 percent alumina and from about 1 percent to about 35 percent copper or other metal as described. The preferred range is from about 80 percent to 90 percent alumina and about 5 percent to 15 percent copper. Of course, greater and lesser amount of copper and alumina may also be effective in certain operations.

The other metal complexes, similar to the copper-alumina complex, which are useful as catalysts in the present invention are prepared in the same manner as the copper-alumina complex. Thus, by precipitating alumina hydrate in an aqueous solution with a chloride of a variable valence metal such as by the addition of hydrochloric acid or the like, the variable metal-alumina complex is coprecipitated.

With respect to the molar ratios of the organics, chlorinating agent and oxygen reactants, employed in the invented process, the reaction to produce chlorinated products will proceed to some extent as long as some of each of the three ingredients is present. In general, however, high conversion of the organics to products is desired and for this result, about 1–150 percent excess of oxygen and about 1 to 80 percent excess of HCl over the stoichiometric amounts are preferred.

The temperature employed for effecting the process of the present invention is generally in the range of 150 to about 350 degrees centigrade and preferably in the range of about 180 to about 250 degrees centigrade. Lower and higher temperatures can be employed, if desired, but the reaction proceeds best in the range mentioned.

The novel process of the present invention is very preferably effected in fluidized bed. In the utilization of a fluidized bed, gaseous reactants of varying velocities, usually from 2 to 20 centimeters per second, are caused to proceed from the bottom of the catalyst bed to the top, said catalyst bed often being a bed of diameter from 2 to 500 centimeters and a height of 10 to 300 centimeters, filled wtih finely divided solid particles containing the complex metal-alumina catalyst. By increasing the velocity of the gaseous reactants, the particles are placed dynamically in suspension in the rising flow of gases, thereby circulating and otherwise behaving like a fluid, such as a liquid, and establishing new surfaces of reaction continually. In this respect, it is especially advantageous that the fluidizing gas is a mixture of reactants, since thereby the catalyst is utilized most effectively. The various factors to be considered in establishing fluidized beds are described in an article by Wilhelm and Kwauk in Chemical Engineering Progress, volume 44, page 201.

The process can also be effected, although not as advantageously, in a fixed bed where tubular or elongated reactors are used having a high length/inner diameter ratio. For example, the diameter of the reactor may usually be from about 2 to 10 centimeters, with the length of the reactor being about 2 to 100 times as large as the inner diameter. The reactors are generally made of soft steel, nickel, or other materials which possess a resistance to corrosion by the reactants and products. Also, reactors which have been coated wtih a corrosion resistant material, e.g., ceramic, can be used. There are, of course, heat removal and other problems associated with fixed bed technology, and alleviated in the case of fluidized beds, that have to be taken into consideration in fixed bed applications.

The term "oxychlorination" as used throughout the specification, examples, and claims refers to a catalyzed process, wherein the catalyst employed is as described herein, in which a chlorinating agent is contacted with an organic reactant in the presence of an oxygen-containing gas and said catalyst. It is believed that in one aspect of this oxychlorination process, the chlorinating agent is produced by the oxidation of hydrogen chloride, which is oxidized to chlorine and water, for example, followed by the reaction of said chlorine with the organic reactant, thereby resulting in the further formation of chlorinated organic compound and hydrogen chloride.

Further, if desired, in another specific aspect of the invention the hydrogen chloride and oxygen containing gas can be added to the catalyst initially in order to activate said catalyst, followed by reaction with the organic reactant.

Products produced in accordance with the process of the present invention are further purified, if desired, by methods known in this art such as washing, distillation and the like.

Aromatic compounds, and their substituted derivatives containing from 6 to about 10 carbon atoms, such as benzene, toluene, can also be oxychlorinated in a fluidized bed such as that described herein.

It has been discovered during investigation of oxychlorination processes that the oxychlorination of acetylene as described herein will result in the formation of trichloroethylene and/or perchloroethylene, which invention will be the subject of a patent application. Similarly, a third patent application relates to the conversion of organic compounds, such as ethylene, to more highly chlorinated organic compounds such as 1,2-dichloroethane by special oxychlorination techniques. Specifically, such invention involves the recycling of unconverted organic reactant.

In order that those skilled in the art may better understand the present invention and the manner in which it may be practiced, the following illustrations and examples are given.

In the specification, examples and claims, parts are by weight and temperatures are in degrees centigrade, unless otherwise stated.

EXAMPLE 1

In a reactor are placed 50 parts or proportions of the previously described complex copper-alumina catalyst of 80–140 mesh particle size (through 80, on 140 mesh screens). Ethylene at the rate of 0.658 molar proportions per hour, anhydrous hydrochloric acid at the rate of 1.53 molar proportions per hour and oxygen at the rate of 0.562 molar proportions per hour are fed into the reactor, which is maintained at a temperature of 210 degrees centigrade. The superficial gas velocity during the reaction was 6 centimeters per second, creating a fluidized bed. Average contact time was 3.4 seconds. The product was recovered at the rate of 64.8 grams per hour by cooling the reactor off-gas with water and then passing the residual gas through a Dry-Ice trap and was shown by gas chromatographic analysis to be 1,2-dichloroethane in 96 percent purity.

When the catalyst described in Example 5 of U.S. Patent 1,963,761 is used, similarly good results are obtained.

EXAMPLE 2

In a manner similar to Example 1, 50 parts of the catalyst utilized in Example 1 were placed in a reactor to form a bed and gaseous reactants were passed through the bed at a superficial velocity of 7 centimeters a second, fluidizing the catalyst bed. The temperature was maintained at 330 degrees centigrade and the following reactants were added at the rates shown:

| | Molar proportions/hr. |
|---|---|
| HCl gas | .67 |
| Air | 1.68 |
| 1,2-dichloroethane | .30 |

Average contact time in the reactor was 2.8 seconds. The reactor gas was passed through a water cooled condenser. The product was recovered as in Example 1. It was in 2 phases. The weight of aqueous phase recovered was 5.8 parts/hr., while the weight of organic phase recovered was 11.82 parts per hour. Such yields, although not substantially stoichiometric, were better than those of comparable processes, using other catalysts.

Gas chromatographic analysis of the organic phase gave the following results:

| | Percent |
|---|---|
| Vinyl chloride | Trace |
| Vinylidene chloride | 0.3 |
| Transdichloroethylene | 0.2 |
| Cis-dichloroethylene | 0.5 |
| 1,2-dichloroethane | 27.2 |
| Trichloroethylene | 0.5 |
| 1,1,2-trichloroethane | 7.6 |
| Perchloroethylene | 6.0 |
| Sym-tetrachloroethane | 57.3 |

EXAMPLE 3

The following reactants were introduced into a fixed reactor bed, comprised of 5 parts of the copper, alumina catalyst as described in Example 1, and 95 parts of graphite of 6–10 mesh maintained at a temperature of 285±5 degrees centigrade.

| | Molar proportions/hr. |
|---|---|
| Ethylene | 1.34 |
| Hydrogen chloride | 2.71 |
| Oxygen | 1.02 |
| Nitrogen | 4.08 |

An average contact time, calculated on the basis of the superficial gas velocity, was 22 seconds.

The following products were taken off:

| | Molar proportions |
|---|---|
| Ethylene | <0.041 |
| 1,2-dichloroethane | 1.17 |
| Hydrogen chloride | .242 |
| Carbon dioxide | 0.077 |
| Carbon monoxide | 0.077 |
| Water | 1.57 |

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for the oxychlorination of organic compounds which comprises contacting in the vapor phase at a temperature of from 150 degrees centigrade to about 350 degrees centigrade an organic compound selected from the group consisting of alkanes of from 2 to about 3 carbon atoms, alkenes of from 2 to about 4 carbon atoms and their partially chlorinated derivatives, with a chlorinating agent selected from the group consisting of hydrogen chloride and mixtures of hydrogen chloride and chlorine and an oxygen-containing gas in the presence of a complex copper-alumina catalyst prepared by coprecipitating alumina and copper from a solution of alumina hydrate and copper chloride by the addition of hydrochloric acid thereto.

2. A process in accordance with claim 1 wherein the reaction is effected in the presence of a fluidized bed of a co-precipitated complex copper-alumina catalyst.

3. A process for the oxychlorination of organic compounds which comprises contacting in the vapor phase at a temperature of from 150 degrees centigrade to about 350 degrees centigrade an organic compound selected from the group consisting of alkanes of from 2 to about 3 carbon atoms, and alkenes of from 2 to about 4 carbon atoms, and their partially chlorinated derivatives, with hydrochloric acid and an oxygen-containing gas in the presence of a fluidized bed of a complex co-precipitated copper-alumina catalyst comprising as a major active ingredient alumina and as a minor ingredient combined copper prepared by coprecipitating alumina and copper from a solution of alumina hydrate and copper chloride by the addition of hydrochloric acid thereto, said oxychlorination reaction being carried out at a temperature of from 150 degrees centigrade to about 350 degrees centigrade.

4. A process in accordance with claim 3 wherein the alkane is ethane.

5. A process in accordance with claim 3 wherein the alkene is ethylene.

6. A process for the preparation of 1,2-dichloroethane which comprises oxychlorinating in the vapor phase ethylene, an oxygen-containing gas, and hydrochloric acid at a temperature of about 180 to about 250 degrees centigrade and in the presence of a fluidized bed of a complex copper-alumina catalyst comprised of 65 to about 99 percent of alumina and from 1 to about 35 percent of combined copper prepared by coprecipitating alumina and copper from a solution of alumina hydrate and copper chloride by the addition of hydrochloric acid thereto, followed by separation of the product, 1,2-dichloroethane.

7. A process for the oxychlorination of organic compounds which comprises contacting in the vapor phase an organic compound selected from the group consisting of alkanes from from two to three carbon atoms and alkenes of from two to about four carbon atoms and their partially chlorinated derivatives, with a chlorinating agent selected from the group consisting of hydrogen chloride, chlorine and mixtures thereof and an oxygen containing gas in the presence of a complex, variable valence metal-alumina catalyst prepared by coprecipitating alumina and a variable valence metal from a solution of alumina hydrate and a variable valence metal halide by the addition of hydrochloric acid thereto.

References Cited

UNITED STATES PATENTS

| 1,963,761 | 6/1934 | Prahl | 260—650 |
|---|---|---|---|
| 2,644,846 | 7/1953 | Johnson et al. | 260—659 |
| 2,783,286 | 2/1957 | Reynolds | 260—659 |
| 2,838,577 | 6/1958 | Cook et al. | 260—659 |
| 2,952,714 | 9/1960 | Milam et al. | 260—659 |
| 3,042,728 | 7/1962 | Hirsh | 260—659 |

FOREIGN PATENTS 1,304,911   8/1962   France.

LEON ZITVER, Primary Examiner.

T. G. DILLAHUNTY, Assistant Examiner.

U.S. Cl. X.R.

252—463; 260—654, 656, 658, 662